No. 715,260. Patented Dec. 9, 1902.
A. B. GRIFFIN.
POST HOLE DIGGER.
(Application filed June 6, 1901.)
(No Model.)
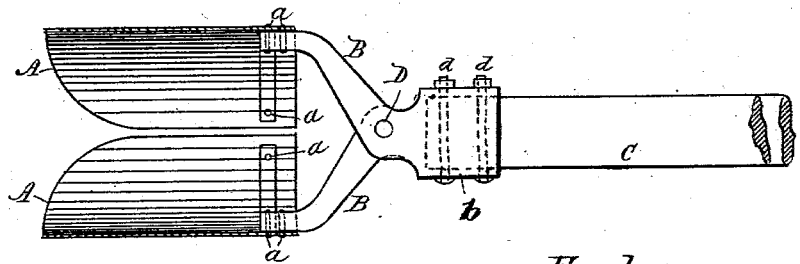
Fig. 1.
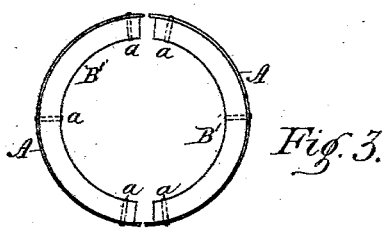
Fig. 3.
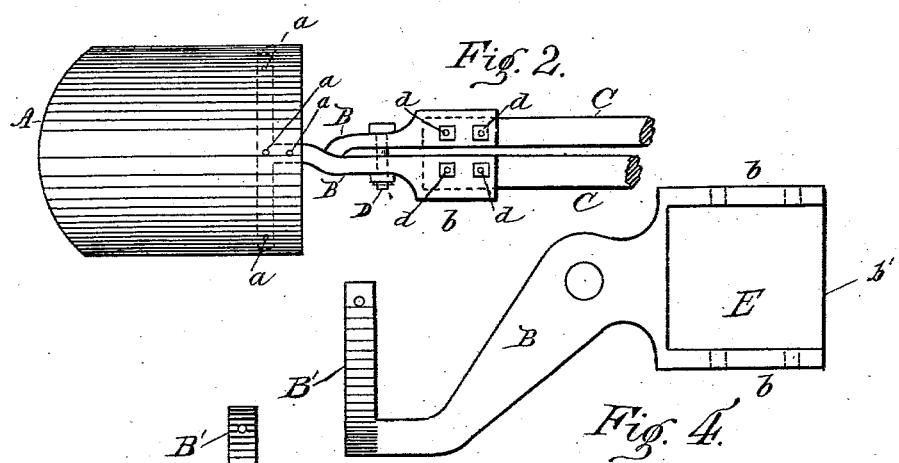
Witnesses,
E. Baylis
Jas Gadsby
Inventor
Albert B. Griffin
By W. Bruce
Atty

UNITED STATES PATENT OFFICE.

ALBERT BENJAMIN GRIFFIN, OF HAMILTON, CANADA, ASSIGNOR OF TWO-THIRDS TO WILLIAM A. SPRATT AND JAMES W. MILLARD, OF HAMILTON, CANADA.

POST-HOLE DIGGER.

SPECIFICATION forming part of Letters Patent No. 715,260, dated December 9, 1902.

Application filed June 6, 1901. Serial No. 63,391. (No model.)

*To all whom it may concern:*

Be it known that I, ALBERT BENJAMIN GRIFFIN, a citizen of the Dominion of Canada, and a resident of the city of Hamilton, in the county of Wentworth, Province of Ontario, Canada, have invented a certain new and useful Post-Hole Digger; and I do hereby declare the following to be a full, clear, and exact description of the same.

This invention relates to post-hole diggers.

The object of the present invention is the provision of a post-hole digger of improved and novel construction, in which the handles are disposed in the most advantageous manner for manipulation of the device in digging a post-hole and removing the loose earth therefrom and wherein the members connecting the handles to the blades are so constructed that the entire device is given strength and durability.

Having the foregoing objects in view, the invention consists of certain improved features of construction and novel combinations and arrangements of parts set forth in detail hereinafter and recited in the appended claim.

In the accompanying drawings, Figure 1 is a side view with the blades in section; Fig. 2, a top view; Fig. 3, an end view looking toward the blades; Fig. 4, an enlarged detail view of the inner side of one of the arms, and Fig. 5 an enlarged detail top view of the other arm.

A represents the blades, which are semicircular in form and provided with curved sharpened cutting edges.

B represents arms, which are provided with semicircular heads B' at their ends and extending in a general transverse direction to the arms, said head being secured to the interior walls of the blades at $a$. The arms B are so shaped as to cross over each other, as shown in Fig. 2, and they are pivoted together on a removable bolt D. The arms are provided with sockets E, which have the top and bottom walls $b$ and the outer or back walls $b'$, said sockets being formed in the inner faces of the arms, and the arms are so formed that their inner faces are straight and adapted to lie close together.

C represents the handles, which have their ends received in the sockets E and fitted against the walls $b$ and $b'$. They are held by bolts $d$, passing through them and the walls $b$. Owing to this construction the handles are firmly held in the sockets and lie close to each other, so that when the blades are closed together the handles constitute, in effect, a single handle. The handles being together and the blades closed, as shown in Figs. 1 and 2, the operator grasps the handles and drives the blades in the ground, working them down to their depth, and then raises the blades, (the handles being still together,) which causes the earth remaining between the blades to be lifted with them. When the blades are clear of the hole, the handles (hitherto lying in parallelism) are slightly separated, thus allowing the earth to drop out. The handles are then closed together, the blades reinserted in the hole and driven farther down, then withdrawn and the earth discharged, and this operation repeated until the required depth of hole has been dug. By removing the bolt D one-half of the device can be used conveniently as a scoop-shovel in clearing drains.

Having thus described my invention, what I claim as new, and desire to secure by Letters Patent, is—

A post-hole digger comprising blades, arms having transversely-disposed heads connected to the blades and crossed over and pivoted together, said arms being provided on their inner faces with sockets extending inwardly from their ends, handles fitted into the sockets and secured therein, said arms, sockets, and handles being so related that when the blades are brought together in position for digging, the handles are coincident and in substantial alinement.

Dated at Hamilton, Ontario, Canada, June 3, 1901.

ALBERT BENJAMIN GRIFFIN.

In presence of—
 E. BAYLIS,
 W. BRUCE.